United States Patent [19]

Goloff

[11] 4,291,535

[45] Sep. 29, 1981

[54] METHOD AND APPARATUS AVOIDING BLOWDOWN LOSSES IN COMPOUND ENGINES

[75] Inventor: Alexander Goloff, East Peoria, Ill.

[73] Assignee: Caterpillar Tractor Co., Peoria, Ill.

[21] Appl. No.: 941,485

[22] Filed: Sep. 11, 1978

[51] Int. Cl.³ .............................................. F02B 37/00
[52] U.S. Cl. ....................................... 60/602; 60/612; 123/315
[58] Field of Search ................. 60/600, 601, 602, 603, 60/605, 612, 614, 615, 620, 597; 123/315

[56] References Cited

U.S. PATENT DOCUMENTS

| | | | |
|---|---|---|---|
| 2,239,922 | 4/1941 | Martinka | 60/620 |
| 2,769,303 | 11/1956 | Lucia et al. | 60/607 |
| 2,819,765 | 1/1958 | Chatterton | 60/624 |
| 3,007,302 | 11/1961 | Vincent | 60/606 X |
| 3,570,240 | 3/1971 | Melchior | 60/600 |
| 3,961,484 | 6/1976 | Harp | 60/624 |

FOREIGN PATENT DOCUMENTS 179926 5/1923 United Kingdom ................. 60/605

*Primary Examiner*—Michael Koczo, Jr.

*Attorney, Agent, or Firm*—Phillips, Moore, Weissenberger, Lempio & Majestic

[57] ABSTRACT

Power output of a compound engine is increased and fuel consumption per unit of output power is reduced by eliminating the blowdown losses heretofore associated with opening of exhaust valves or ports. Exhaust gases of a positive displacement engine stage drive a turbine or other gas-expansion stage, the two stages being mechanically coupled to jointly contribute to power output. The turbine stage may also drive a compressor to supercharge the positive displacement stage. Flow-regulating means in the exhaust gas passage between the two stages maintain exhaust gas passage pressure at a level corresponding to that which exists in the combustion chambers of the positive displacement stage at the time that exhaust valves or ports open. This avoids exhaust gas expansion between stages and reduces or eliminates the blowdown losses which would otherwise occur. Power losses at the positive displacement stage from the high back pressure are compensated for by the additional power recovered by the turbine stage as a result of the high expansion ratio at the turbine. Automatic control means may adjust the flow-regulating means in response to changes of engine operating conditions in order to maintain the optimum exhaust gas pressure.

9 Claims, 10 Drawing Figures

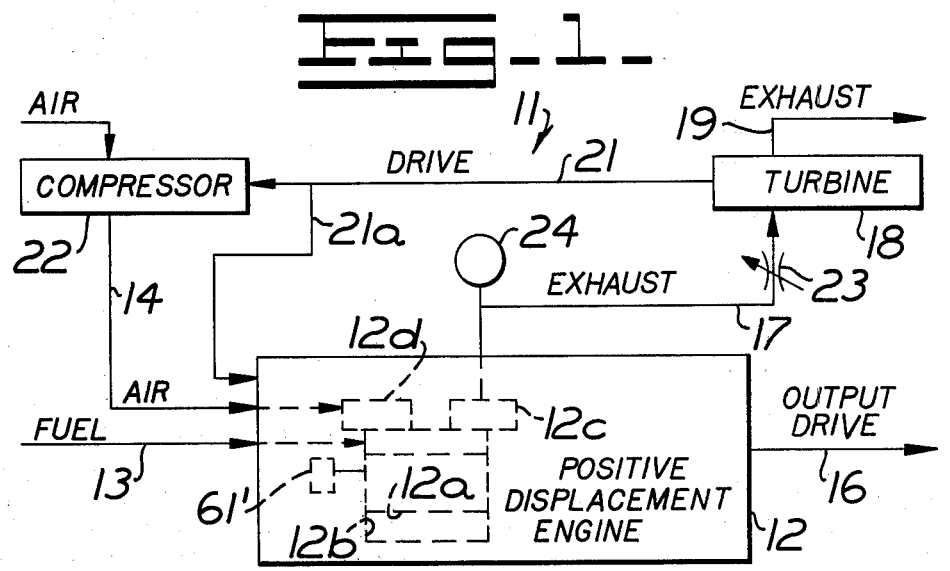
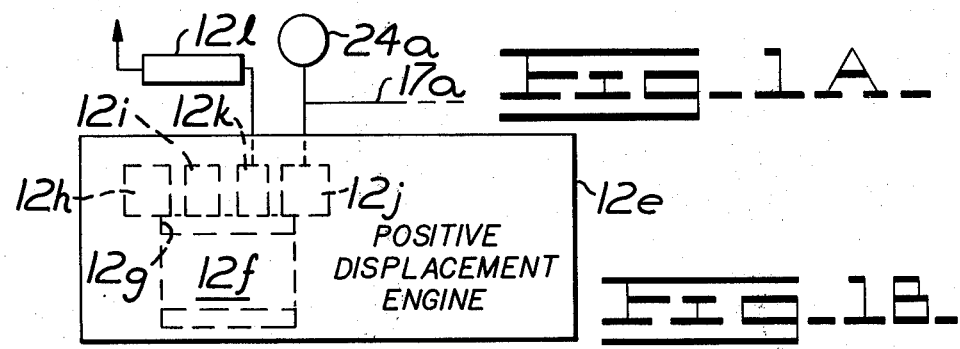
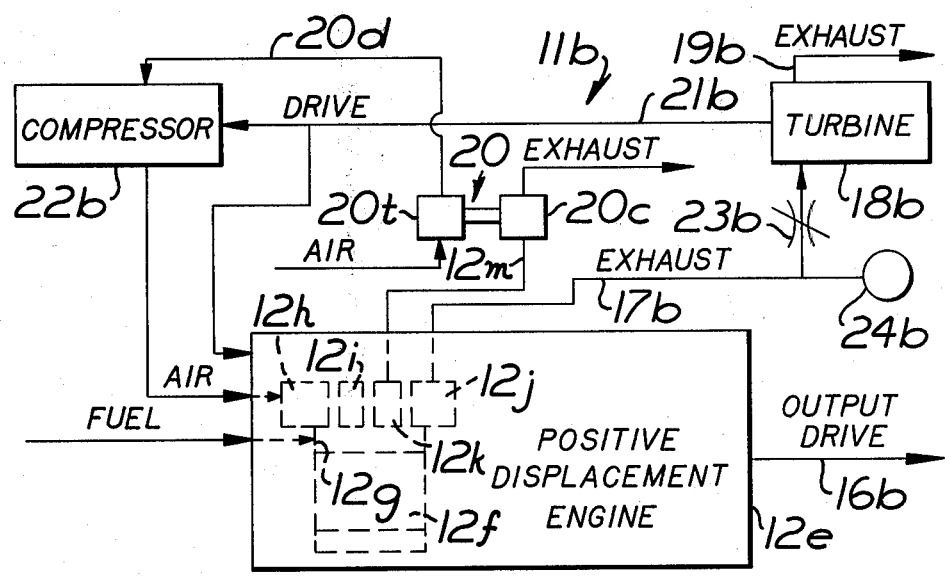

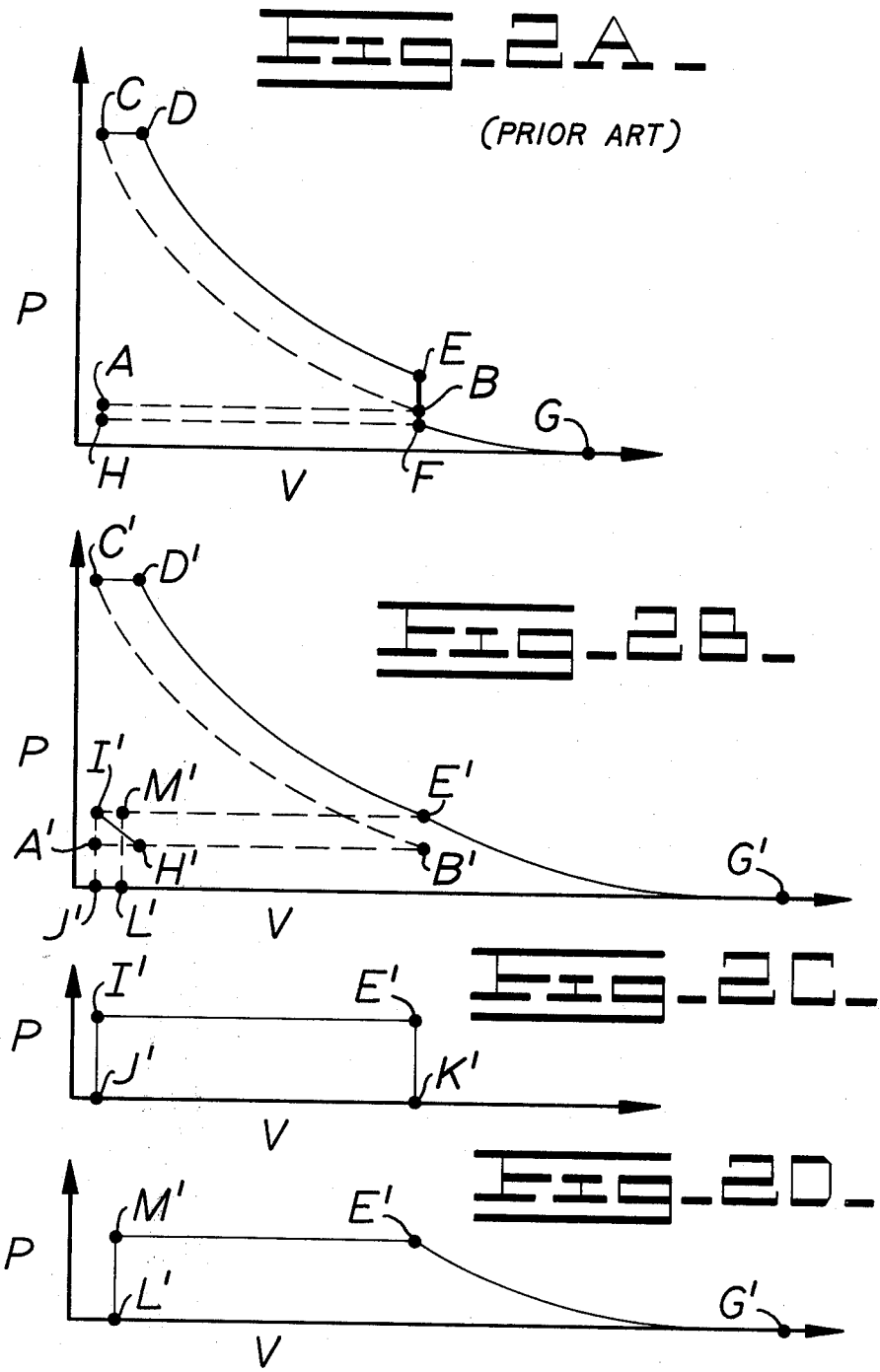

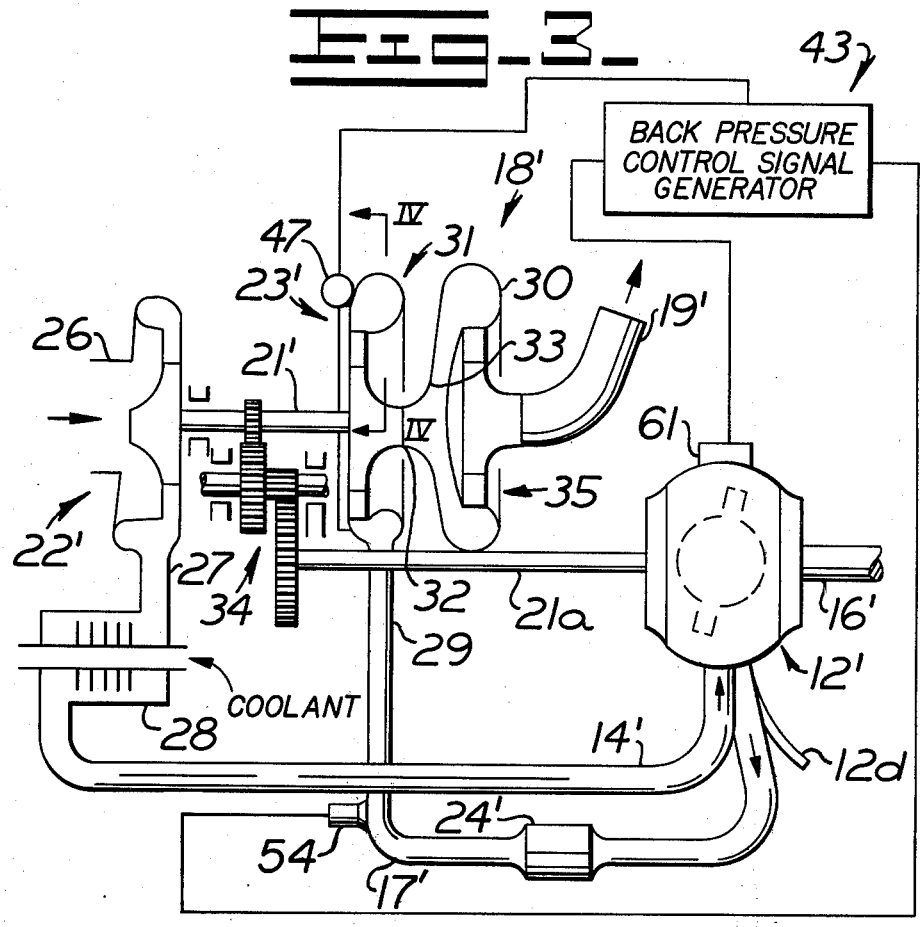
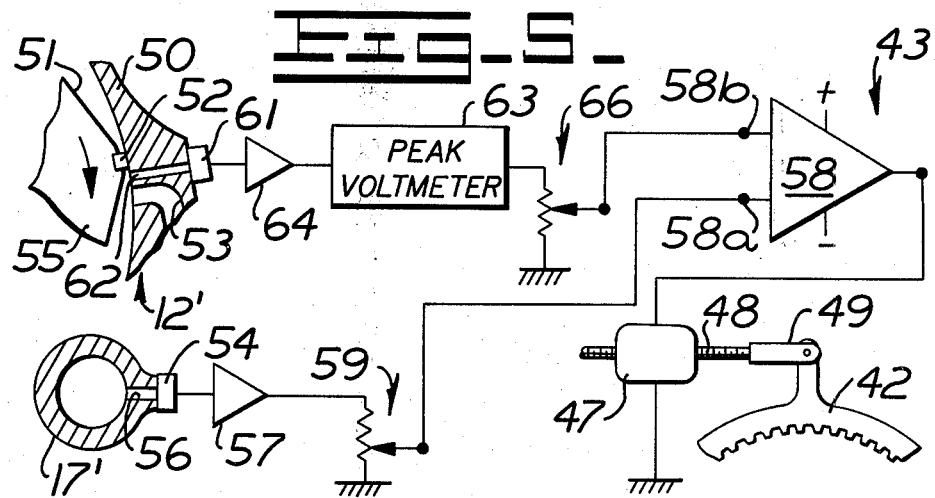

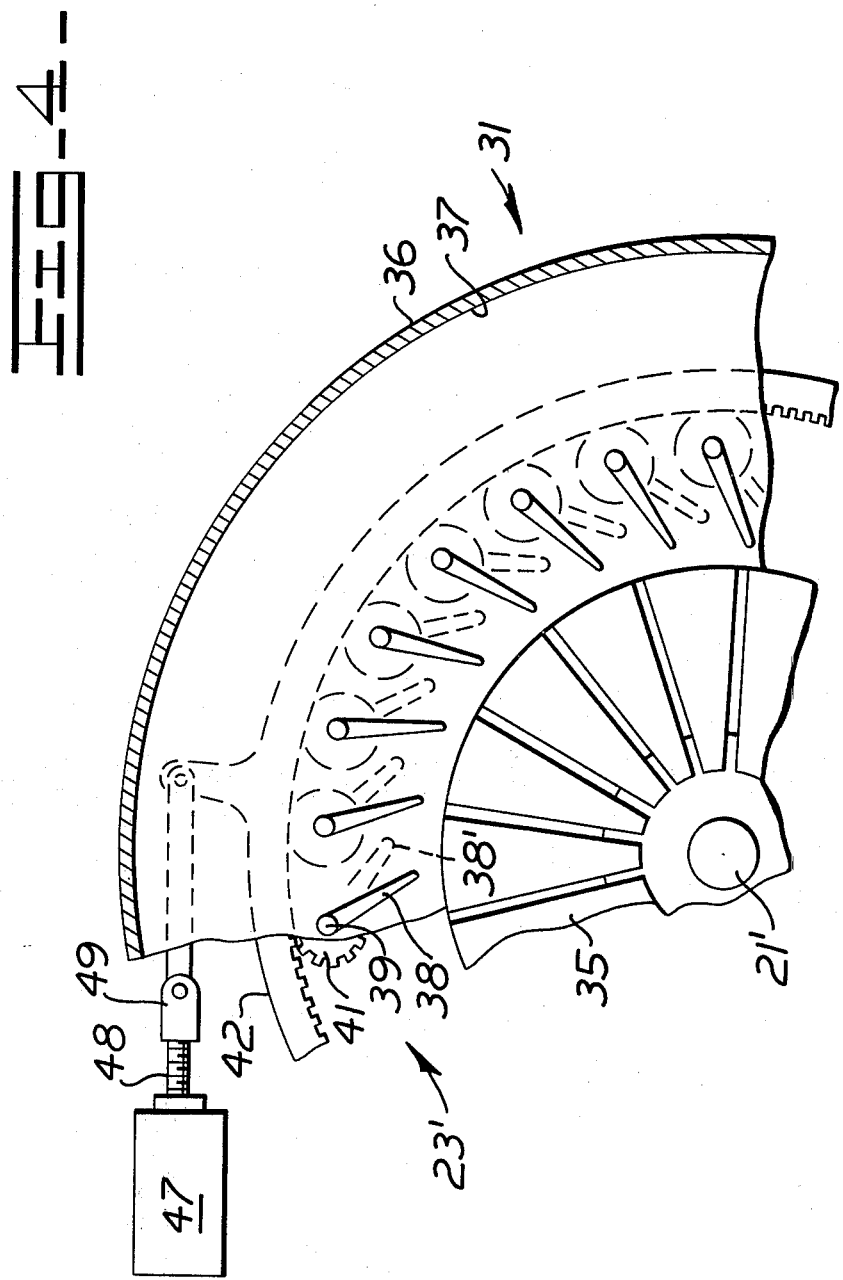

METHOD AND APPARATUS AVOIDING BLOWDOWN LOSSES IN COMPOUND ENGINES

BACKGROUND OF THE INVENTION

This invention relates to compound engines and more particularly to power plants having a fuel-burning positive displacement engine stage supplemented by an additional engine stage driven by the exhaust gas pressure from the first engine stage.

Single-stage positive displacement engines, including both reciprocating and rotary engines, produce usable power as a result of the expansion of hot pressurized gases against pistons or other movable elements which are coupled to an output shaft. Practical considerations usually make it necessary to release or exhaust such pressurized gases prior to full expansion. Consequently the final phase of gas expansion, following opening of the exhaust valves or the like, does no useful work, giving rise to a form of thermodynamic loss which is often referred to as blowdown loss.

Greater recovery of the energy content of consumed fuel can be realized with compound engines which have a second engine stage, typically a turbine, that is driven by the exhaust gas from a positive displacement first engine stage. The second engine stage produces additional power from the final phase of gas expansion and the additional power is variously delivered to a second independent output shaft or to the crankshaft of the positive displacement engine or, in the case of turbocharged systems, to a compressor which precompresses air at the intake of the positive displacement engine stage to further increase thermodynamic efficiency.

In prior compound engines, blowdown losses continue to be the greatest thermodynamic loss. For example in a turbocharged diesel engine the cylinder pressure at the exhaust valve opening point may typically be 150 psi (1034 kPa). Upon opening of the exhaust valve, this gas pressure blows down or reduces to the exhaust manifold pressure which is typically about 25 to 30 psi (172 to 207 kPa) without doing any useful work. The final phase of gas expansion occurs in the turbine developing additional powder which would otherwise also be lost. Although the sizable blowdown loss has already occurred, the turbine still produces enough energy to operate a compressor which raises the engine inlet manifold pressure to around 30 psi (207 kPa) or somewhat more and this increases the efficiency of the engine thermodynamic cycle by boosting or precompression of intake air. In some compound engines, the turbine generates more power than is needed to operate the compressor and the surplus is transmitted to the positive displacement engine main shaft to supplement the power produced directly by the engine, although this does not usually occur to a significant extent in a typical turbocharged engine.

In some forms of steam engines, as opposed to internal combustion engines, blowdown losses are substantially eliminated. In double or triple expansion steam engines for example the lower pressure stage precompresses a portion of the exhaust steam trapped in the cylinder to a pressure level similar to that of the exhaust passage of the stage ahead of it. A line between the two stages is then opened transferring the charge of steam from one stage to the next without any appreciable blowdown loss. A single-stage steam engine precompresses the steam to boiler pressure prior to opening the inlet valve, avoiding blowdown losses in transit from the boiler to the engine.

There appear to have been few prior attempts to effect a reduction of blowdown losses in internal combustion engines, conceivably because this requires a relatively high exhaust manifold pressure or back pressure as it is commonly termed. A high exhaust manifold pressure or back pressure is universally believed to increase certain thermodynamic losses resulting in a substantial lessening of engine efficiency. An indicator card cycle diagram or pressure-volume diagram for a single-stage internal combustion engine having a high back pressure exhibits a large negative energy loop which would seemingly indicate that such a cycle would not be desirable.

Some attempts to reduce blowdown loss in compound engines of the turbocharged diesel form have been made by providing individual exhaust conduits from each cylinder of the diesel to the intake of the turbine with each such exhaust conduit being of smaller cross-section area than the exhaust valve opening at the associated cylinder. This reduces the pressure drop, and therefore the blowdown losses, to an extent that offsets the loss from the increased back pressure. However, sizable blowdown losses remain, pressure fluctuations in the small conduits are very severe and the turbine operates at widely varying pressures and efficiencies. These effects are not conducive to high efficiency of the overall compound engine operation.

Elimination of blowdown losses in a practical and effective manner would substantially lower the Specific Fuel Consumption factor of a compound engine thereby causing a greater proportion of the chemical energy content of consumed fuel to be delivered to the output shaft in the form of usable kinetic energy.

SUMMARY OF THE INVENTION

The present invention is directed to overcoming one or more of the problems as set forth above.

In one aspect of the present invention, a compound engine includes a first engine stage of the positive displacement internal combustion form having an air intake and at least one combustion chamber in which fuel is burned and having exhaust means for releasing pressurized exhaust gas from the combustion chamber and having output means for transmitting power to a rotary load, a second engine stage of the form driven by expansion of pressurized gas received at a gas inlet, exhaust gas conduit means connecting the first and second engine stages and forming an exhaust gas flow passage for transmitting the exhaust gas from the exhaust means of the first engine stage through the inlet of the second engine stage to operate the second engine stage by expansion of the exhaust gas therein, drive-transmitting means coupled to the second engine stage for obtaining supplemental output power from the second engine stage, and flow-regulating means for maintaining the pressure in the exhaust gas flow passage at a level substantially similar to the pressure which exists in the combustion chamber of the first engine stage at the time that the exhaust means thereof opens, the flow-regulating means being adjustable to provide for variation of the size of the exhaust gas flow passage.

In another aspect, the invention provides a method for increasing the output power produced by a compound engine which includes an internal combustion engine of the positive displacement form in which pressurized exhaust gases are released from at least one combustion chamber, including the steps of utilizing the pressurized exhaust gases to produce additional power by transmitting the gases to a gas expansion engine, and preventing expansion of the exhaust gases between the combustion chambers and the gas-expansion engine, wherein the step of preventing expansion of the exhaust gases between the combustion chambers and the gas-expansion engine is accomplished by varying the effective size of the flow passage between the internal combustion engine and the gas-expansion region of the gas-expansion engine in response to variations of the pressure of the gases at the time of release from the combustion chamber.

In still another aspect, the invention provides a method for increasing the output power produced by a compound engine which includes an internal combustion engine of the positive displacement form in which pressurized exhaust gases are released from at least one combustion chamber, wherein the internal combustion engine has at least a pair of exhaust means for releasing the exhaust gases from the combustion chamber, which includes the steps of utilizing the pressurized exhaust gases to produce additional power by transmitting the gases to a gas expansion engine, including transmitting the pressurized exhaust gases from the combustion chamber to the gas expansion engine through a first of the exhaust means while maintaining the second of the exhaust means closed, preventing expansion of the exhaust gases between the combustion chambers and the gas-expansion engine, subsequently closing the first exhaust means and opening the second exhaust means to release remaining exhaust gases from the combustion chamber, and recovering energy from the exhaust gas released through the second exhaust means and utilizing the recovered energy to precompress the air supplied to the intake manifold of the positive displacement engine.

According to the present invention, blowdown losses are substantially eliminated in a compound engine of the form having a fuel-burning positive displacement engine stage and having an additional gas expansion stage. As a result, the compound engine output power produced by consumption of fuel at a given rate is substantially increased.

Exhaust gases from the positive displacement engine stage are used to drive the second engine stage and the two stages may be mechanically coupled to combine the power developed by each. Blowdown losses are substantially reduced or eliminated by maintaining the exhaust gas flow passing from the positive displacement engine to the second stage engine at a pressure level substantially similar to the gas pressure level which exists within the positive displacement engine just prior to opening of the exhaust valves or ports of the positive displacement engine.

As no sizable gas expansion takes place in passage between the two engine stages, significant blowdown losses do not occur and the second stage produces more power than has heretofore been the case. Power losses at the positive displacement stage due to the relatively high back pressure are less than the power gains at the second stage so that the net effect is a pronounced increase in overall thermodynamic efficiency.

In one form of the invention, the second engine stage may also operate means for supercharging or precompressing inlet air for the first stage to further increase efficiency.

Exhaust gases traveling from the positive displacement stage to the second stage are passed through flow-regulating means to maintain a back pressure corresponding to the gas pressure which exists just prior to opening of the exhaust valves or the like of the positive displacement stage. An accumulator or surge chamber may be present, if desired, to suppress pressure fluctuations. In instances where the engine operating conditions vary, an adjustable flow-regulating means is used and in one form of the invention an automatic control system senses changes of operating conditions and adjusts the flow-regulating means to change back pressure to the extent necessary to maintain the above-described relationship.

The invention, together with further objects and advantages thereof, will best be understood by reference to the following description of preferred embodiments and by reference to the accompanying drawings.

BRIEF DESCRIPTION OF THE DRAWINGS

In the accompanying drawings:

FIG. 1 is a schematic block diagram illustrating certain basic aspects of the method and apparatus for increasing the efficiency of a compound engine, FIG. 1A is a schematic illustration of a modification of a portion of the system of FIG. 1 in which exhaust gas recirculation may be reduced, FIG. 1B is a schematic illustration of a further modification of the system of FIG. 1 in which additional energy may be recovered from exhaust gas, FIG. 2A is a typical indicator card or pressure-volume cycle diagram for a prior art turbocharged or turbo-compounded diesel engine, FIG. 2B is a pressure-volume cycle diagram for a typical compound engine embodying the present invention, FIG. 2C is an isolated portion of the pressure-volume diagram of FIG. 2B better illustrating energy losses due to high back pressure at one stage of the thermodynamic cycle, FIG. 2D is another isolated portion of the pressure-volume diagram of FIG. 2B better illustrating energy recovered at another stage of the cycle and which more than compensates for the losses represented by FIG. 2C, FIG. 3 is a diagrammatic illustration of a compound engine embodying the invention, FIG. 4 is a partial section view taken along line IV—IV of FIG. 3 better illustrating adjustable flow-regulating means operative in the gas flow passage between stages of the compound engine of FIG. 3, and FIG. 5 is a circuit diagram of one form of back pressure control circuit for the apparatus of FIG. 3.

DESCRIPTION OF PREFERRED EMBODIMENTS

Referring initially to FIG. 1, a compound engine 11 in accordance with the invention has a first engine stage 12 which may be any of various internal combustion engines of the positive displacement form including both reciprocating engines and rotary engines. First engine stage 12 is supplied with a fuel as indicated at 13 and with air as indicated at 14 to support combustion of the fuel. The fuel may be of any of the known types such as diesel oil, gasoline, butane or the like that is appropriate to the specific engine design. First engine stage 12 delivers output power at an output shaft 16 which may be coupled to a rotary load which is to be driven. The combustion products or exhaust gases of first engine stage 12 are directed into an exhaust conduit 17. For convenience of discussion, first engine stage 12 in this example will be considered to be a reciprocating engine operating on a diesel cycle and which has pistons 12a reciprocating in combustion chamber cylinders 12b with exhaust valve means 12c for releasing exhaust gases from the cylinders into exhaust manifold conduit 17 and having air intake valve means 12d, suitable detailed constructions for such engines being known to the art.

The compound engine 11 has a second engine stage 18 which may be of any of the various known reciprocating or rotary gas expansion forms that are driven by the pressure of incoming gas. For convenience of discussion, second engine stage 18 will be considered to be a rotary gas turbine in this example. While additional gas expansion stages such as additional turbine stages may be employed if desired, the exhaust of second engine stage 18 in this particular example is vented to atmosphere as indicated at 19.

First and second engine stages 12 and 18 are mechanically coupled as indicated by drive paths 21 and 21a in FIG. 1 and, as depicted symbolically in the drawing, under most operating conditions the direction of mechanical power flow is from second engine stage 18 to first engine stage 12 so that power developed by the second stage supplements that produced by the first stage and is delivered at output shaft 16. A portion of the output power from second engine stage 18 may also be utilized for other purposes. most notably, where the first engine stage 12 is to be supercharged as in this example, second engine stage 18 may also be drivingly coupled to a compressor 22 which pressurizes the intake air that is supplied to first engine stage 12 through an intake manifold flow path 14.

In the absence of further arrangements the system of FIG. 1 as described up to this point would constitute an essentially conventional compound engine. Sizable blowdown losses occur in such a compound engine as a result of the fact that exhaust gases are released from the cylinders 12b or other combustion chambers of a positive displacement engine at a pressure well above atmospheric and then immediately expand as they enter the exhaust manifold. This portion of the gas expansion does no useful work in the conventional compound engine. This may be better understood by reference to FIG. 2A which is a thermodynamic cycle diagram or indicator card, showing gas pressure as a function of volume for a typical conventional compound engine having a turbocharged diesel cycle first engine stage and a gas turbine second engine stage.

Referring to FIG. 2A, the cycle commences at line A-B as intake air at an elevated or boosted pressure is received in a cylinder while the associated piston moves away from top dead center and increases the cylinder volume. When the intake valve closes and the piston motion reverses, decreasing cylinder volume, the air is further compressed along line B-C. Upon ignition of the charge of air and fuel as the piston again reaches top dead center, the released energy maintains the gaseous combustion products at a fairly constant high pressure represented by line C-D during the initial portion of the increase in cylinder volume caused by retreat of the piston from the top dead center position. Following burning of the fuel, the hot gas charge is then expanded along line D-E and in the process does work on the receding piston. Exhaust valves or the like are then opened at point E. In the conventional compound engine this immediately drops gas pressure through the original intake pressure level B to a still lower pressure F. The pressure drop represented by line E-B-F does no recoverable work and gives rise to the blowdown loss of the cycle. In a typical supercharged diesel engine, pressure at point E may be around 150 psi (1034 kPa) while the exhaust manifold pressure represented by point F may be of the order of 25 to 30 psi (172 to 207 kPa) and thus the blowdown loss is substantial.

The final expansion of the gas in the second engine stage from point F to point G, which is atmospheric pressure, does work which is largely recovered as output power of the second stage. Following opening of the exhaust valve and during the subsequent return of the piston towards top dead center, the gas pressure within the first stage engine cylinder remains essentially constant at a value corresponding to the exhaust manifold pressure, as indicated by line F-H, as the exhaust valve remains open while combustion products are being expelled from the cylinder. Upon closing of the exhaust valve and reopening of the intake valve or the like, cylinder pressure increases slightly along line H-A to the boost pressure and the cycle then recommences. The energy represented by the area underlying lines H-F and F-G is sufficient to drive the compressor to boost air intake pressure notwithstanding the blowdown losses which have occurred. At high engine loads, where fuel consumption per cycle is high, extra energy produced by the second stage is combined directly with that produced by the first stage.

In accordance with the present invention, with reference again to FIG. 1, blowdown losses are substantially eliminated by transmitting the exhaust gases of first engine stage 12 to second engine stage 18 at a relatively elevated pressure level which is maintained substantially the same as the pressure which exists in the first stage engine cylinders 12b or the like at the moment that the exhaust valve means 12c opens. Thus, little or no expansion of the first stage exhaust gas is allowed to occur until such exhaust gas is within the second stage or turbine 18 where such gas expansion will do useful work and produce recoverable energy at the output shaft 21 of the turbine. Maintenance of this relatively high pressure within the first stage exhaust conduit 17 may be accomplished by sizing the gas flow path at the inlet of second stage 18, in relation to the rate of gas release through exhaust valve means 12c, to provide the high back pressure while also channeling the gas flow at that point to provide optimum-velocity energy for operating the second stage turbine. While a fixed flow-regulating means may be used if the compound engine operates at constant speed under constant load and constant fuel consumption rate, these conditions are usually not met in practice. In most cases an adjustable or variable flow-regulating means 23 is preferable, the flow-regulating means typically being a variable geometry nozzle within the turbine inlet as will hereinafter be described in more detail. The effective flow orifice through regulating means 23 may then be increased or decreased, when boost pressure and/or fuel consumption rate changes, to vary the exhaust conduit 17 pressure to match the changed pressure within cylinders 12b at the time of opening of exhaust valve means 12c. Preferably the variable flow regulation is performed automatically, by means which sense variations of boost pressure and fuel consumption rate or which directly sense differences between the pressure in exhaust conduit 17 and engine cylinder 12b just prior to the opening of the exhaust valves, as will hereinafter be discussed in more detail.

The release of exhaust gas by positive displacement engines tends to be somewhat pulsating as the exhaust valves associated with different cylinders and the like open at different times and some further variation in rate of exhaust gas release may arise from differences in the volume of cylinders or the like. To suppress pressure pulsations from these causes, an accumulator 24 or surge chamber may be communicated with the exhaust conduit 17 in instances where the conduit itself does not have sufficient volume to serve this purpose.

As the second engine stage 18 is mechanically coupled to the first engine stage 12 through drive paths 21 and 21a, the mechanical output energy developed by second stage 18 which exceeds that needed to drive compressor 22 is combined with the power produced by the first engine stage and is transmitted through the crank shaft or the like to the first stage output shaft 16. Energy recovered by the second stage 18 in this manner includes energy which would have been dissipated in blowdown losses in a conventional arrangement and thus the output power delivered by the compound engine 11 at output shaft 16 is substantially greater than that of a conventional compound engine having similar first and second engine stages and consuming the same fuel at the same rate. In effect, the Specific Fuel Consumption factor of the compound engine, defined as the amount of standard fuel consumed per unit power output per unit time, is significantly lowered.

Understanding of the operation of the compound engine as depicted in FIG. 1 may be facilitated by comparing the modified thermodynamic cycle diagram of FIG. 2B with that of the conventional compound engine as depicted in FIG. 2A.

Referring now to FIGS. 1 and 2B in conjunction, the air intake portion A'-B', compression portion B'-C', combustion portion C'-D', and gas expansion portion D'-E' of the engine cycle within the first stage engine may each be similar to that of the conventional compound engine. However, at the termination of those portions of the cycle, there is no blowdown or expansion of the gas into an exhaust manifold at lower pressure. Instead, as the exhaust valve 12c at the first stage engine cylinder 12b opens at point E', the piston 12a is able to simply push the gas into a manifold, exhaust conduit 17, which always is at the same pressure as the pressure in the cylinder at the exhaust valve opening point. The gas may then expand through the second engine stage 18 turbine along line E'-G' while at the same time the cycle diagram for the first stage cylinder proceeds along horizontal line E'-I' as the piston moves to decrease the volume of the cylinder while displacing gas from the cylinder into the exhaust conduit. It may be observed that the pressure level represented by line E'-I' is substantially higher than the corresponding portion of the conventional thermodynamic cycle and is indicative of an extremely high back pressure. This means that the piston 12a must do a sizable amount of work which would constitute negative work or reduced power output in a conventional system. The amount of such negative work corresponds to the rectangular area underlying line E'-I' which is depicted in FIG. 2C as rectangle E'-I'-J'-K'. Mathematically, this negative work is a function of piston stroke multiplied by back pressure.

At first consideration it might appear that this sizable negative work which must be done by the first engine stage would detract very seriously from the output power of the engine but this is not in fact the case. Most of this first engine stage energy loss is recovered as positive work by the second engine stage. If the turbine of the second engine stage 18 were 100% efficient, all of such energy would be recovered as usuable power but in practice a turbine may typically be about 80% efficient and thus in the present system typically about 80% of the negative work represented by rectangle E'-I'-J'-K' is offset by positive work within the second stage. The energy delivered by the second engine stage 18 is represented by the area underlying line M'-E'-G' of FIG. 2B which is the area L'-M'-E'-G' as depicted in FIG. 2D. In other words, the energy which is negative at the piston of the first engine stage due to back pressure is positive at the second engine stage or turbine. This is a point which has not heretofore been taken into account possibly because in the past much of such energy was not available because of severe blowdown losses. In the present thermodynamic cycle it is recoverable because there is little or no blowdown loss.

Thus in comparison with the conventional thermodynamic cycle of FIG. 2A, the first engine stage cycle diagram of the present compound engine as shown in 2B has an essentially conventional positive loop and a relatively very large negative loop which at first consideration might be judged to detract from power output. As pointed out above, the negative loop is not in fact a serious disadvantage because a very large proportion of the negative work is converted to positive work within the second engine stage. As there are little or no blowdown losses, a relatively large amount of energy may be recovered in the second stage and this is more than sufficient to offset the large negative work loop of the thermodynamic cycle of FIG. 2B.

Referring again to FIG. 2B, at point I' in the thermodynamic cycle of the present compound engine the exhaust valve of the first engine stage cylinder closes. In contrast to many prior engines the intake valve 12d may be timed to open slightly after top dead-center position since exhaust manifold pressure is higher than intake manifold pressure in this case. This gives rise to a short period, indicated by line I'-H', during which the remaining exhaust gas in the cylinder re-expands slightly, causing the cylinder pressure to drop down to about the intake manifold pressure at which point the intake valves open. This results in a small amount of exhaust gas recirculation and a small loss in volumetric efficiency, represented by the distance between point H' and vertical line I'-J'. Provided that the intake valve means has a large flow aperture in the open position this loss and pumping losses are not overly significant. If desired, the exhaust gas recirculation may be reduced by techniques such as those illustrated in FIGS. 1A and 1B.

With reference to FIG. 1A in particular, for example, many large positive displacement engines 12e have a pair of intake valves 12h and 12i of different sizes at each cylinder 12g and also have a pair of exhaust valves or the like 12k and 12j also of different sizes. In an engine of this form, exhaust gas recirculation may be reduced by utilizing the larger exhaust valve 12j to discharge most of the combustion gases, along line E'-I' of FIG. 2B, into the exhaust conduit 17a leading to the second-stage engine. The larger exhaust valve 12j is then closed at point I' of FIG. 2B while the smaller exhaust valve 12k is opened and held open briefly while the cylinder 12f is in the vicinity of the top dead center position to exhaust the remaining combustion gas to atmosphere preferably through a muffler 12l. While this small amount of gas exhausted through the smaller exhaust valve 12k does no useful work, the power loss involved may be offset by the gains from reduction of excessive exhaust gas recirculation. In this connection, some small remaining amount of exhaust gas recirculation may be desirable to inhibit the production of pollutants as is understood within the art.

FIG. 1B illustrates a further modification of the system of FIG. 1A by which a portion of the energy otherwise exhausted through the small exhaust valve may be recovered and utilized. In particular, the positive displacement engine 12e having a pair of exhaust valves 12j and 12k at each cylinder 12g may be similar to that described with reference to FIG. 1A and the timing of opening and closing of the exhaust valves 12j and 12k may be also similar to that previously described. Unlike the embodiment of FIG. 1A, the exhaust line 12m from the smaller-sized exhaust valve 12a does not discharge to atmosphere through a muffler. Instead exhaust line 12m delivers combustion gas to the turbine 20c of a free-running turbocharger 20 to drive the turbocharger. The compressor 20t of the turbocharger has an outlet conduit 20d which is also the air intake conduit of the previously described compressor 22b which is driven by the second stage engine 18b. Thus in this embodiment, the compressors 20t and 22b jointly function as a two-staged air compressor with the initial stage being operated by the exhaust gas discharged through the separate exhaust conduit 12m of the smaller of the exhaust valves 12k. The amount of additional power recovered in this manner, as opposed to simply venting exhaust 12m to atmosphere as in the system of FIG. 1A, is relatively small and in some instances may not justify the added structural complexity brought about by the addition of the turbocharger 20.

Referring now to FIG. 3, another example of a compound engine 11' is shown in more detail. In this example the first engine stage 12' is a rotary internal combustion engine of the SAR (slant axis rotary) form although, as has been pointed out, any of various other forms of positive displacement engine may be utilized. The first engine stage 12' which may be of known internal construction has an air-intake conduit 14', an exhaust conduit 17' and a rotary shaft 16' which may be coupled to the load to be driven by the compound engine. The accumulator or surge chamber in the exhaust flow path is in this instance defined by an enlargement 24' of the exhaust conduit 17'. A centrifugal compressor 22' or supercharger has an air intake 26 and a compressed air outlet 27. To increase efficiency of the compound engine, outlet 27 of the compressor may be communicated with first-stage air-intake conduit 14' through a water- or air-cooled aftercooler 28 of known construction in instances where the first-stage engine 12' is of a type adaptable to aftercooling.

To efficiently recover energy by expansion of gas from a relatively high initial pressure level, the second engine stage 18' in this example is a two-staged turbine of the centripetal form, although a smaller or larger number of turbine stages may be utilized and other forms of gas expansion engine may be utilized if desired. Exhaust conduit 17' of the first engine stage 12' communicates with the gas inlet 29 of the first turbine stage 31 and the outlet 32 of the first turbine stage is communicated with the inlet 33 of the second turbine stage 30 which then exhausts to atmosphere through exhaust pipe 19'.

The second engine stage 18' is oriented with its rotary axis parallel to that of the first engine stage 12' and in coaxial relationship to the rotary axis of compressor 22'. Thus the output shaft 21' of the second engine stage may be mechanically coupled directly to the compressor 22' to drive the compressor and may be indirectly coupled to the first stage engine 12' through suitable reduction gearing 34 and shaft 21a'. Gearing 34 accommodates to differences in the operating speeds of the first- and second-stage engines and is not needed if the two stages operate at a common speed. Step-up gearing may be substituted for the reduction gearing 34 in instances where the first engine stage operates at a higher speed than the second engine stage.

Considering now the mechanism used in this example to maintain the pressure in the exhaust gas flow path from first engine stage 12' to second engine stage 18' at a high level corresponding to that which exists in the combustion chambers of the first stage 12' when the exhaust means begins to open, reference should be made to FIG. 4 in conjunction with FIG. 3. The flow-regulating means 23' for this purpose may be built into the first turbine 31 of the second engine stage as in this example or may be provided at both turbine stages.

The first turbine stage 31 may have a rotor 35 mounted coaxially on the turbine shaft 21' and situated within a housing 36. Housing 36 is shaped to define an annular gas intake chamber 37 which encircles rotor 35 and which is shaped to channel the pressurized exhaust gas flow towards the periphery of the rotor 35. In order to provide a variable gas flow opening between chamber 37 and rotor 35 and in order to accelerate and direct the gas flow to provide for efficient turbine operation, variable geometry inlet nozzle structure of known form may be used as the flow-regulating means 23'. In particular, a series of spaced-apart vanes 38 are situated within the flow path between the chamber 37 portion of the housing 36 and the rotor. Each vane 38 is attached to an associated one of a series of rotatable shafts 39 which extend through the wall of housing 36 and each of which couples to one of a series of gears 41 mounted coaxially on the shaft outside the housing. Shafts 39 and the associated gears 41 are equiangularly spaced around the rotational axis of the turbine and are equidistant from the rotational axis enabling each of the gears 41 to be engaged by a single large internally toothed ring gear 42 which is situated outside the housing 36 in coaxial relationship to the rotary axis of the turbine.

Thus by rotary movement of the ring gear 42 each of the spur gears 41 and associated shafts 39 may be caused to turn synchronously and to simultaneously change the angle of each of the vanes 38 relative to radii of the rotor 35. All vanes 38 are oriented to form the same angle with respect to a radius of rotor 35 that passes through the center of the shaft 39 associated with the particular vane. This similar angle which each vane forms relative to the associated radii of the rotor 35 may be increased or decreased by turning of the ring gear 42. Counterclockwise rotation of the ring gear 42 as viewed in FIG. 4 increases the relatively small vane angle indicated by the solid-line outlines of the vanes to the greater vane angle depicted by dashed vane outlines 38'. As the spacing of each vane 38 from the two adjacent vanes becomes progressively less as this angle is increased, the aggregate size of the flow passage from chamber 37 to the edge of rotor 35 may be selectively decreased by turning ring gear 42 counterclockwise and may be increased by turning the ring gear in an opposite direction.

Accordingly, the ring gear 42 enables adjustment of the size of the effective gas flow passage at the inlet of the second engine stage turbines for the purpose of maintaining an optimum back pressure between the first and second engine stages as hereinbefore described. Adjustment of this effective flow passage may be desirable to optimize efficiency when the fuel consumption rate varies and also if intake manifold pressure or boost pressure changes as a result of an engine speed change or other causes. An automatic back pressure control circuit 43 may be coupled to the first stage engine 12' and to an actuator 47 at second engine stage 18' to effect this adjustment as dictated by changes in engine operating conditions.

Where, as in the example to be described, the back pressure control circuit 43 produces an electrical signal to indicate a need to adjust the effective gas flow passage at the turbine inlet, actuator 47 may be an electrical motor and in this example is a reversible DC motor of the form which turns in one direction in response to a positive DC voltage and in an opposite direction in response to a negative voltage. Actuator motor 47 engages and drives a threaded lead screw 48 which is coupled to ring gear 42 by linkage 49 so that the motor responds to a positive voltage by rotating vanes 38 to reduce the effective flow path within the inlet of the turbine and responds to a negative voltage by turning the vanes in an opposite sense to increase the effective flow path.

One suitable detailed construction for the back pressure control circuit 43 is depicted in FIG. 5. The previously described exhaust gas conduit 17' between the stages of the compound motor 11' of FIG. 3 is depicted in FIG. 5 in cross section. Also depicted in FIG. 5 is a small portion of the rotor 55 and housing 50 of the rotary engine 12' which constitutes the first stage of the compound engine of FIG. 3 as previously described. As is known in the art, the combustion chamber 51 of a rotary engine of this general type is defined by a space between rotor 55 and housing 50 which follows a seal 52 that turns with the rotor. Exhausting of combustion products from chamber 51 occurs when the seal 52 reaches an exhaust port 53 in the housing. In accordance with the operating principles previously described, the primary function of the back pressure control circuit 43 is to maintain the pressure within first-stage exhaust conduit 17' similar to the pressure which exists within the motor combustion chamber 51 just prior to opening of the combustion chamber into exhaust port 53.

For this purpose, a first pressure signal generator 54 may be mounted at exhaust conduit 17' and has a pressure-sensitive probe 56 in communication with the interior of the conduit. The first pressure signal generator 54 may be a transducer of the known form which produces a positive voltage proportional to the pressure at the end of probe 56. A voltage amplifier 57 transmits the output of first pressure signal generator 54 to a first input 58a of a differential power amplifier 58 through a first potentiometer 59.

A second pressure signal generator 61 of similar type is mounted at the housing 50 of the second-stage rotary engine and has a pressure-sensitive probe 62 situated at the inner wall of the housing in position to be communicated with the combustion chamber 51 just prior to the time that seal 52 opens the combustion chamber to exhaust port 53 in the course of each cycle. The output signal from the second pressure signal generator 61 is thus essentially a series of brief electrical pulses or pips having a maximum voltage proportional to the pressure within the first-stage engine combustion chamber 57 just prior to discharge of the combustion products. These output pulses from the second pressure signal generator 61 are transmitted to the input of a peak voltmeter 63 through a voltage amplifier 64, the peak voltmeter being of the known form which produces a continuous output voltage having a magnitude which is proportional at any given time to the peak or maximum value of the currently received input pulses. The output signal from the peak voltmeter 63 is transmitted to the second input 58b of differential power amplifier 58 through a second potentiometer 66. The differential power amplifier 58 produces a positive output voltage when the voltage at first input 58a exceeds that at second input 58b and a negative output voltage if there is an inverse voltage differential at the two inputs and produces no output signal when the voltages applied to the two inputs are equal. The output of amplifier 58 is coupled to the previously described actuator motor 47 to drive the motor.

Thus if the pressure within exhaust conduit 17' should exceed the pre-exhaust pressure in combustion chamber 51, actuator motor 47 is energized to enlarge the flow passage into the second stage of the compound engine. As previously described, this causes a reduction of the pressure in the exhaust conduit 17' to bring it back into equilibrium with the pre-exhaust pressure in the first-stage combustion chamber 51. When that equilibrium is re-established, the voltages at the two inputs of differential power amplifier 58 are again equal, the output signal from the amplifier terminates and operation of actuator 47 stops. Similarly, if the pre-exhaust pressure in the combustion chamber 51 should start to rise above the pressure within exhaust conduit 17', the resulting negative output voltage from differential power amplifier 58 energizes actuator motor 47 to decrease in the effective size of the flow passage into the second-stage turbine. This raises the pressure within exhaust conduit 17' and maintains it in equilibrium with the increased pre-exhaust pressure within the combustion chamber 51. Potentiometers 59 and 66 enable manual adjustment of the relative signal strengths from the first and second pressure signal generators 54 and 61 in order to facilitate accommodating of the circuit to different specific engines.

If the back pressure control circuit 43 of FIG. 5 is to be used with a reciprocating piston type of engine such as that described with reference to FIG. 1 instead of the rotary positive displacement engine as described in connection with FIG. 3, then the pressure-sensitive probe 62 of the second transducer 61, may be positioned as depicted at 61' in FIG. 1 to communicate with the cylinder 12b just prior to the exhaust valve 12c opening point at or near the bottom dead center position of the piston 12a.

The back pressure control circuit 43 as described above employs a single second pressure signal generator 61 at a single combustion chamber of the first-stage engine. This is a workable arrangement in an engine which may have a plurality of combustion chambers since the pre-exhaust pressures in all of the combustion chambers tend to be similar at any given time. Additional signal generators 61 may be provided at others of the combustion chambers, together with signal averaging means, if it is desired to obtain a more precise matching of exhaust conduit pressure with combustion chamber pressure.

The back pressure control circuit 43 as described above for purposes of example acts by directly measuring and comparing the pre-exhaust pressure within the first-stage engine compression chamber and the exhaust gas conduit of the first-stage engine. Signals for controlling the actuator 47 may also be derived indirectly under certain conditions by monitoring other engine parameters. In first-stage engines of the kind herein described variations of the combustion chamber pre-exhaust pressure are attributable to variations of fuel consumption rate and/or boost pressure (which is itself a function of engine speed). Thus these parameters may be monitored to derive the pre-exhaust pressure signal indirectly if desired. If the engine is of a form which is governed to operate at a constant speed, then a signal for controlling the actuator 47 may be obtained by monitoring the movements of the governor or an element controlled by the governor such as a fuel rack since, under the governed constant speed condition, a change of pre-exhaust combustion chamber pressure in the first-stage engine is necessarily attributable to a change in fuel consumption. Similarly, equivalent digital circuits or fluid circuits may also be employed to perform the automatic control function.

Thus, while the invention has been described with respect to certain specific embodiments for purposes of example, many variations are possible and it is not intended to limit the invention except as defined in the following claims.

The embodiments of the invention in which an exclusive property or privilege is claimed are defined as follows:

1. A compound engine comprising:
   a first engine stage of the positive displacement internal combustion form having an air intake and at least one combustion chamber in which fuel is burned and having exhaust means for releasing pressurized exhaust gas from said combustion chamber and having output means for transmitting power to a rotary load,
   a second engine stage of the form driven by expansion of pressurized gas received at a gas inlet,
   exhaust gas conduit means connecting said first and second engine stages and forming an exhaust gas flow passage for transmitting said exhaust gas from said exhaust means of said first engine stage through said inlet of said second engine stage to operate said second engine stage by expansion of said exhaust gas therein,
   drive-transmitting means coupled to said second engine stage for obtaining supplemental output power from said second engine stage, and
   flow-regulating means for maintaining the pressure in said exhaust gas flow passage at a level substantially similar to the pressure which exists in said combustion chamber of said first engine stage at the time that said exhaust means thereof opens, wherein said flow-regulating means is adjustable to provide for variation of the size of said exhaust gas flow passage.

2. A compound engine as defined in claim 1 further comprising control means, connected between said first engine stage and said flow-regulating means, for reducing said exhaust gas flow passage when the pressure therein is less than the pressure which exists in said combustion chamber at the time that said exhaust means opens and for enlarging said exhaust gas flow passage when the pressure therein starts to rise above the pressure in said combustion chamber at the time that said exhaust means opens.

3. A compound engine as defined in claim 1 wherein said second engine stage includes at least one turbine and wherein said flow-regulating means is situated in the gas intake region of said turbine, and includes variable nozzle means for adjusting the size of the effective gas flow passage through said intake region of said turbine to maintain said exhaust gas flow pressure at said level.

4. A compound engine comprising:
   a first engine stage of the positive displacement internal combustion form having an air intake and at least one combustion chamber in which fuel is burned and having exhaust means for releasing pressurized exhaust gas from said combustion chamber and having output means for transmitting power to a rotary load,
   a second engine stage of the form driven by expansion of pressurized gas received at a gas inlet,
   exhaust gas conduit means connecting said first and second engine stages and forming an exhaust gas flow passage for transmitting said exhaust gas from said exhaust means of said first engine stage through said inlet of said second engine stage to operate said second engine stage by expansion of said exhaust gas therein,
   drive-transmitting means coupled to said second engine stage for obtaining supplemental output power from said second engine stage,
   flow-regulating means for maintaining the pressure in said exhaust gas flow passage at a level substantially similar to the pressure which exists in said combustion chamber of said first engine stage at the time that said exhaust means thereof opens,
   an air compressor coupled to said second engine stage and driven thereby and having a compressed air outlet communicated with said air intake of said first engine stage,
   first pressure signal generator means on said engine for producing a first pressure signal indicative of pressure within said exhaust gas flow passage,
   second pressure signal generator means on said engine for producing a second pressure signal indicative of the pressure which exists in said combustion chamber just prior to release of said exhaust gas therefrom,
   an actuator coupled to said flow-regulating means to vary said size of said exhaust gas flow passage in response to a control signal, and
   a control signal generator having inputs coupled to said first and second pressure signal generator means and having an output coupled to said actuator, said control signal generator having means for energizing said actuator to enlarge said exhaust gas flow passage when said first pressure signal exceeds said second pressure signal and for energizing said actuator to reduce said exhaust gas flow passage when said second pressure signal exceeds said first pressure signal.

5. A compound engine as defined in claim 4 wherein said control signal generator is a differential amplifier having first and second voltage signal inputs and having an output coupled to said actuator for transmitting control voltages thereto in response to voltage differentials at said first and second inputs, and wherein said first pressure signal generator means is a first transducer having a pressure sensitive element exposed to the pressure within said exhaust gas flow passage and having means for producing a first voltage signal indicative of said pressure therein, said second pressure signal generator means being a second transducer having a pressure sensitive element exposed to the pressure which exists within said combustion chamber just prior to opening of said exhaust means and having means for producing voltage pulses indicative of said pressure, first signal transmitting means coupled between said first transducer and said first input of said differential amplifier, and second signal transmitting means coupled between said second transducer and said second input of said differential amplifier, said second signal transmitting means including a peak voltmeter which transmits a voltage having a magnitude corresponding to the maximum magnitude of said voltage pulses.

6. A method for increasing the output power produced by a compound engine which includes an internal combustion engine of the positive displacement form in which pressurized exhaust gases are released from at least one combustion chamber, comprising the steps:
utilizing said pressurized exhaust gases to produce additional power by transmitting said gases to a gas expansion engine, and
preventing expansion of said exhaust gases between said combustion chambers and said gas-expansion engine, wherein said step of preventing expansion of said exhaust gases between said combustion chambers and said gas-expansion engine is accomplished by varying the effective size of the flow passage between said internal combustion engine and the gas-expansion region of said gas-expansion engine in response to variations of the pressure of said gases at the time of release from said combustion chamber.

7. The method of claim 6 further comprising:
determining the pressure of exhaust gases passing from said combustion chamber to said gas expansion engine,
determining the pressure within said combustion chamber at the time of release of said exhaust gas therefrom,
enlarging said flow passage when said exhaust gas pressure exceeds said combustion chamber pressure, and
reducing said flow passage when said exhaust gas pressure is less than said combustion chamber pressure.

8. A method for increasing the output power produced by a compound engine when includes an internal combustion engine of the positive displacement form in which pressurized exhaust gases are released from at least one combustion chamber, comprising the steps:
utilizing said pressurized exhaust gases to produce additional power by transmitting said gases to a gas expansion engine,
preventing expansion of said exhaust gases between said combustion chambers and said gas-expansion engine,
using one portion of the output power of said gas-expansion engine to precompress air supplied to said combustion chamber of said internal combustion engine and combining another portion of said output power of said gas-expansion engine with the output power of said internal combustion engine,
sensing the pressure of said air supplied to said combustion chamber and sensing the fuel consumption rate of said internal combustion engine, and
increasing the effective size of the flow passage from said combustion chamber to said expansion engine in response to increases of said pressure and in response to decreases of said fuel consumption rate and decreasing said effective size of said flow passage in response to decreases of said pressure and in response to increases of said fuel consumption rate.

9. A method for increasing the output power produced by a compound engine which includes an internal combustion engine of the positive displacement form in which pressurized exhaust gases are released from at least one combustion chamber, wherein said internal combustion engine has at least a pair of exhaust means for releasing said exhaust gases from said combustion chamber, comprising the steps:
utilizing said pressurized exhaust gases to produce additional power by transmitting said gases to a gas expansion engine, including transmitting said pressurized exhaust gases from said combustion chamber to said gas expansion engine through a first of said exhaust means while maintaining the second of said exhaust means closed, preventing expansion of said exhaust gases between said combustion chambers and said gas-expansion engine,
subsequently closing said first exhaust means and opening said second exhaust means to release remaining exhaust gases from said combustion chamber, and
recovering energy from the exhaust gas released through said second exhaust means and utilizing said recovered energy to precompress the air supplied to the intake manifold of said positive displacement engine.

* * * * *